(12) United States Patent
Cutter et al.

(10) Patent No.: US 8,060,923 B2
(45) Date of Patent: Nov. 15, 2011

(54) TRUSTED LICENSE REMOVAL IN A CONTENT PROTECTION SYSTEM OR THE LIKE

(75) Inventors: Benjamin Brooks Cutter, Kirkland, WA (US); Brian P. Evans, Redmond, WA (US); Clifford P. Strom, Sammamish, WA (US); Vikas Khandelwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 10/831,280

(22) Filed: Apr. 23, 2004

(65) Prior Publication Data

US 2005/0240533 A1 Oct. 27, 2005
US 2006/0265334 A9 Nov. 23, 2006

(51) Int. Cl.
*H04L 9/00* (2006.01)
(52) U.S. Cl. .......................................... 726/10; 713/156
(58) Field of Classification Search .................. 713/150, 713/155–159, 173, 175, 182–186, 188–189; 726/1–8, 10, 17–19, 21, 27, 30; 705/58, 705/67, 75–76, 18; 709/203, 229, 220–221, 709/223–225, 246; 382/115–119; 711/1, 711/100, 156, 205; 707/4–7, 10, 100, 200, 707/202; 326/8
See application file for complete search history.

(56) References Cited

U.S. PATENT DOCUMENTS

| | | | | |
|---|---|---|---|---|
| 5,715,403 A * | 2/1998 | Stefik | | 395/244 |
| 6,073,124 A * | 6/2000 | Krishnan et al. | | 705/59 |
| 6,189,146 B1 * | 2/2001 | Misra et al. | | 717/177 |
| 6,226,618 B1 * | 5/2001 | Downs et al. | | 705/1 |
| 6,438,690 B1 | 8/2002 | Patel et al. | | 713/156 |
| 6,477,649 B2 * | 11/2002 | Kambayashi et al. | | 726/27 |
| 6,792,531 B2 * | 9/2004 | Heiden et al. | | 713/158 |
| 6,826,606 B2 * | 11/2004 | Freeman et al. | | 709/223 |
| 6,826,690 B1 * | 11/2004 | Hind et al. | | 713/186 |
| 6,922,724 B1 * | 7/2005 | Freeman et al. | | 709/223 |

(Continued)

FOREIGN PATENT DOCUMENTS

EP 1292065 A1 3/2003

(Continued)

OTHER PUBLICATIONS

Hong, S. et al., "On the construction of a powerful distributed authentication server without additional key management", *Computer Communications*, 2000, 23, 1638-1644.

(Continued)

*Primary Examiner* — Kim Vu
*Assistant Examiner* — Leynna Truvan
(74) *Attorney, Agent, or Firm* — Woodcock Washburn LLP (57) ABSTRACT

A digital license includes an identification of a removal service that can authorize removing such license. A client selects the license to be removed and the service, constructs a challenge including therein a challenge license identification block (LIB) identifying the license to be removed, and sends the challenge to the service. The service receives the challenge, stores at least a portion of the challenge in a database, constructs a response corresponding to the challenge and including therein a response LIB identifying the license to be removed and an identification of the service, and sends the response to the client. The client receives the response, employs the response LIB from the response to identify the license to be removed, and removes the identified license upon confirming that the identification of the service in the identified license matches the identification of the service in the response.

22 Claims, 4 Drawing Sheets

U.S. PATENT DOCUMENTS

| | | | |
|---|---|---|---|
| 6,959,291 B1 * | 10/2005 | Armstrong et al. | 705/59 |
| 7,028,180 B1 * | 4/2006 | Aull et al. | 713/156 |
| 7,123,608 B1 * | 10/2006 | Scott et al. | 370/353 |
| 7,216,368 B2 * | 5/2007 | Ishiguro | 726/32 |
| 7,260,721 B2 * | 8/2007 | Tanaka et al. | 713/170 |
| 7,310,732 B2 * | 12/2007 | Matsuyama et al. | 713/176 |
| 7,451,202 B2 * | 11/2008 | Nakahara et al. | 709/223 |
| 2002/0013772 A1 * | 1/2002 | Peinado | 705/51 |

FOREIGN PATENT DOCUMENTS

| | | | |
|---|---|---|---|
| WO | WO 00/58811 | * | 10/2000 |
| WO | WO 00/59150 | * | 10/2000 |
| WO | WO 01/52021 A1 | * | 7/2001 |
| WO | WO 02/01335 A2 | * | 1/2002 |
| WO | WO 02/23315 A2 | * | 3/2002 |
| WO | WO 2005/109202 A2 | * | 11/2005 |

OTHER PUBLICATIONS

Managing Digital Rights in Online Publishing, "How two publishing houses maintin control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *It Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

Stallings, W. Ph.D., "Network and Internetwork Security Principles and Practice", 1995, Prentice-Hall, Inc., 3 pages.

* cited by examiner

TRUSTED LICENSE REMOVAL IN A CONTENT PROTECTION SYSTEM OR THE LIKE

TECHNICAL FIELD

The present invention relates to an architecture and method for a client or the like in a content protection system or the like to notify a removal service or the like that a digital license for rendering corresponding digital content is to be returned, deleted, or otherwise removed from use by the client. More particularly, the present invention relates to such an architecture and method whereby the notification and removal are performed in a trusted manner.

BACKGROUND OF THE INVENTION

Figure 1:
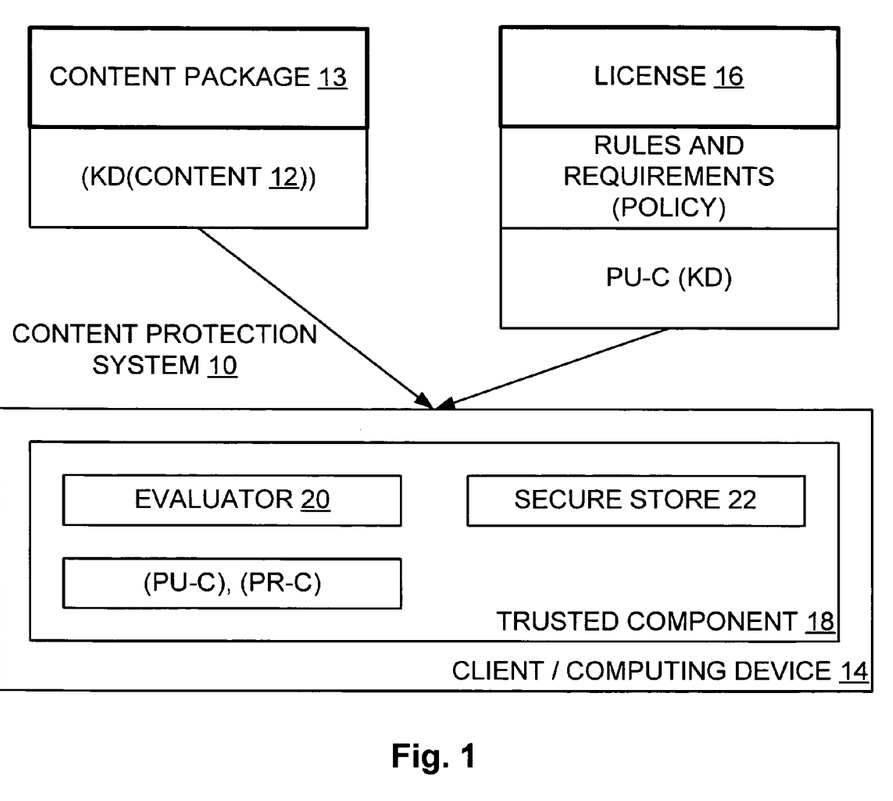
FIG. 1 is a block diagram showing an enforcement architecture of an example of a trust-based system, including a client having a trusted component for rendering digital content only in accordance with a corresponding digital license.

As is known, and referring now to FIG. 1, a content protection and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A copy protection system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based copy protection system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 and/or rules may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the copy protection system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the copy protection system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that rules are satisfied, the digital content 12 can then be rendered. In particular, to render the content 12, the decryption key (KD) is obtained from a pre-defined source such as the aforementioned license 16 and is applied to (KD(CONTENT)) from the content package 13 to result in the actual content 12, and the actual content 12 is then in fact rendered.

The trusted component 18 may at times be required to maintain state information relevant to the rendering of a particular piece of content 12 and/or the use of a particular license 16. For example, it may be the case that a particular license 16 has a play count requirement, and accordingly the trusted component 18 must remember how many times the license 16 has been employed to render corresponding content 12 or how many more times the license 16 may be employed to render the corresponding content 12. Accordingly, the trusted component 18 may also include at least one persistent secure store 22 within which such state information is persistently maintained in a secure manner. Thus, the trusted component 18 stores such state information in such secure store 22 in a persistent manner so that such state information is maintained even across sessions of use on the computing device 14. Such secure store 22 is likely located on the computing device 14 of the trusted component 18, although such secure store 22 may alternately be located elsewhere.

In a copy protection system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Typically, the content 12 is encrypted according to a symmetric key such as the aforementioned key (KD) to result in (KD(content)), and (KD(content)) therefore is also decrypted according to (KD) to result in the content 12. Such (KD) is in turn included within the license 16 corresponding to the content 12. Oftentimes, such (KD) is encrypted according to a public key such as the public key of the computing device 14 (PU-C) upon which the content 12 is to be rendered, resulting in (PU-C (KD)). Note, though, that other public keys may be employed, such as for example a public key of a user, a public key of a group of which the user is a member, etc.

It is to be appreciated that from time to time the user, the computing device 14, the trusted component 18, or another entity (hereinafter, the client) may wish to remove a license 16 from use in connection therewith. For example, it may be the case that the client no longer wishes to render the corresponding content 12, or that the client wishes to transfer the license 16 to another client. Although the client could merely remove the license 16 on its own, it may be the case that the license 16 is stored in a store such as the secure store 22 and is therefore not accessible except under controlled circumstances, or it may be the case that an external entity wishes to ensure that the license 16 is in fact removed. In one envisioned scenario, where a client that purchased the license 16 from a service for value and wishes to 'return' the license 16 for a refund, it is to be expected that the service would require some assurance that the returned license 16 is in fact removed from the client. In another envisioned scenario, where a client that purchased the license 16 from a service for a first computing device 14 and wishes to transfer the license 16 to a second computing device 14, it is likewise to be expected that the service would require some assurance that the transferred license 16 is in fact removed from the first computing device 14.

Accordingly, a need exists for an architecture and method that effectuates trusted removal of a license 16 from use by a client. In particular, a need exists for an architecture and method that notifies a removal service or the like in a trusted manner that the license 16 is to be removed from use by a client or the like and that in fact removes the license 16 in a trusted manner from use by the client.

SUMMARY OF THE INVENTION

The aforementioned needs are satisfied at least in part by the present invention in which a method is provided to remove at least one digital license from a client computing device. Each digital license includes an identification of a removal service that can authorize removing such license. In the method, the client selects each license to be removed and the service, constructs a challenge including therein a challenge license identification block (LIB) identifying each license to be removed, and sends the challenge to the service. The service receives the challenge, stores at least a portion of the challenge in a database, constructs a response corresponding to the challenge and including therein a response LIB identifying each license to be removed and an identification of the service, and sends the response to the client. The client receives the response, employs the response LIB from the response to identify each license to be removed, and removes each identified license upon confirming that the identification of the service in the identified license matches the identification of the service in the response. Thus, concurrently with removing each license from the computing device, the server is notified in a trusted manner that each license has been removed in a trusted manner.

After removal, the client may construct an acknowledgment (ACK) corresponding to the response, and sends the ACK to the service. The service receives the ACK and notes in the database that the response was acknowledged.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 2:
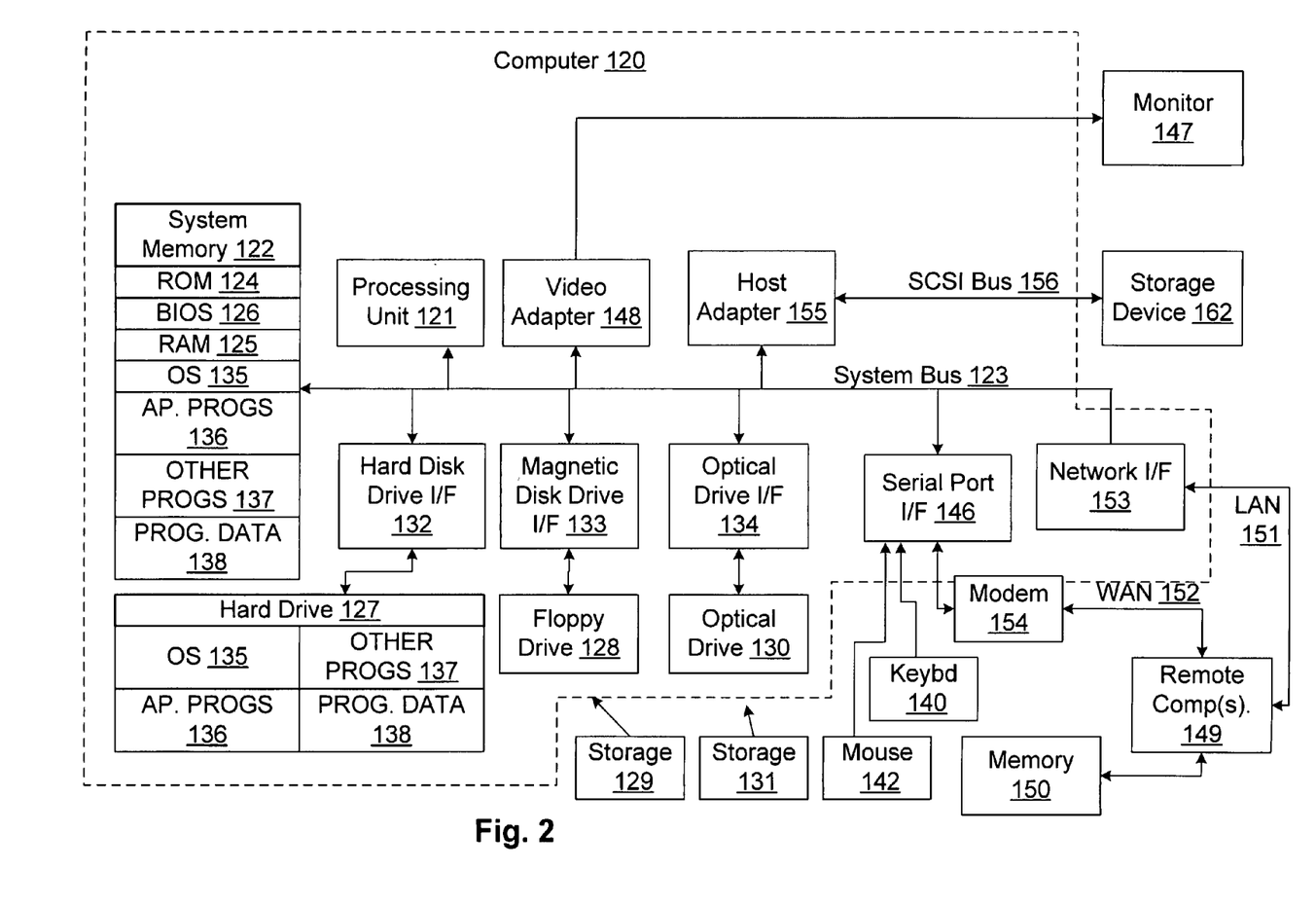
FIG. 2 is a block diagram representing a general purpose computer system in which aspects of the present invention and/or portions thereof may be incorporated.

FIG. 2 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Trusted License Removal

In the present invention, removal of a digital license 16 on a computing device or client 14 having a content protection system 10 is effectuated and notification to a removal service 24 (FIG. 3) of the removal is also effectuated in a trusted manner. Thus, with such notification, the service 24 may for example credit a purchaser of the license 16 for a 'return', or may allow the purchaser or other obtainer of the license 16 to 'transfer' property rights incumbent in the removed license 16 to another license 16 on another client 14. With the present invention, then, a provider/licensor of digital content 12 can provide a user with the ability to 'return' unwanted content by ensuring that a corresponding license 16 is no longer available to the user, and can also provide the user with the ability to 'transfer' content 12 from a first client 14 to a second client 14 by ensuring that the corresponding license 16 tied to the first client 14 is no longer available to the user. Of course, in the latter case, the provider/licensor also issues a corresponding license 16 tied to the second client 14. Notably, in either case, the provider/licensor is provided with a trusted method of ensuring that each license 16 removed from a client 12 is in fact removed or otherwise made unavailable to the client 12.

Note that content protection denotes a spectrum of methods and technologies for protecting digital content 12 such that such content 12 cannot be used in a manner inconsistent with the wishes of the content owner and/or provider. Methods include copy protection (CP), link protection (LP), conditional access (CA), rights management (RM), and digital rights management (DRM), among others. The basis of any content protection system 10 is that only a trusted application that ensures proper adherence to the implicit and/or explicit rules for use of protected content 12 can access same in an unprotected form. Typically, content 12 is protected by being encrypted in some way, where only trusted parties are able to decrypt same.

Copy protection, in the strictest sense, specifically applies to content 12 residing in a storage device, whereas link protection applies to content 12 flowing between applications/devices over a transmission medium. Conditional access can be thought of as a more sophisticated form of link protection, where premium programs, channels and/or movies are encrypted in transit. Only subscribers who have paid for access to such content 12 are provided with the keys necessary to decrypt same.

Digital Rights Management is an extensible architecture where the rules regarding sanctioned use of a particular piece of content 12 are explicit and bound to or associated with the content 12 itself. DRM mechanisms can support richer and more expressive rules than other methods while providing greater control and flexibility at the level of individual pieces of content or even sub-components of that content. An example of a Digital Rights Management system is set forth in U.S. patent application Ser. No. 09/290,363, filed Apr. 12, 1999 and U.S. Provisional Application No. 60/126,614, filed Mar. 27, 1999 each of which is hereby incorporated by reference in its entirety.

Rights Management is a form of DRM that is organizationally based in that content 12 can be protected to be accessible only within an organization or a subset thereof. An example of a Rights Management system is set forth in U.S. patent applications Ser. Nos. 10/185,527, 10/185,278, and 10/185,511, each filed on Jun. 28, 2002 and hereby incorporated by reference in its entirety.

Figure 3:
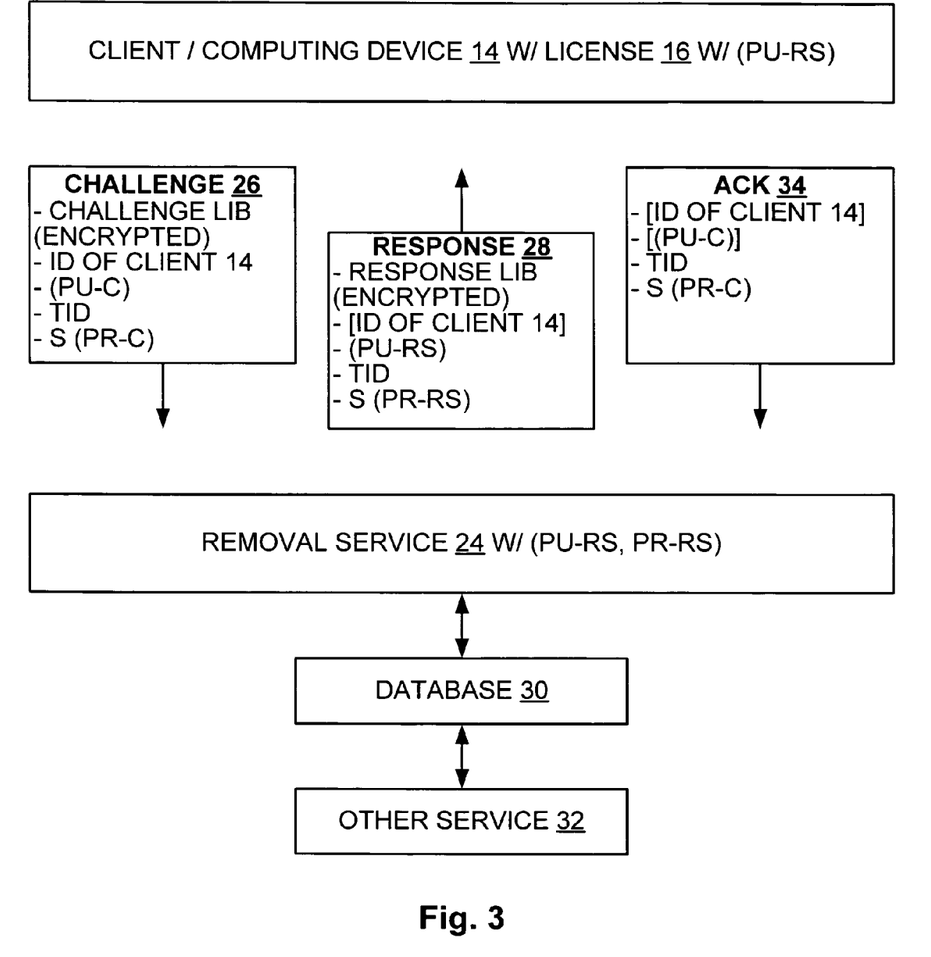
FIG. 3 is a block diagram showing the relationship between the client of FIG. 1 and a removal service in the course of trusted removal of a license from the client in accordance with one embodiment of the present invention.

Turning now to FIG. 3, it is seen that a client 14 and a service 24 are shown. As may be appreciated, the client 14 may be any type of computing device 14, and has one or more licenses 16 therein, each of which corresponds to a piece of content 12 that may be rendered based on such license 16, presuming of course that the license 16 so allows. The service 24 is in communication with the client 14 by an appropriate communications medium, and is employed to receive notification of the removal of one or more of the licenses 16 tied to the client 14. Note that such service 24 may be the service that issued each license 16 to be removed, or may be another service.

In one embodiment of the present invention, each service 24 that may be employed to remove a license 16 is in possession of a public key (PU-RS) and a corresponding private key (PR-RS), and each license 16 on the client 14 can only be removed in connection with a particular service 24 by including therewith the public key (PU-RS) of such service, as will be seen in more detail below. Thus, a license 16 that does not include therewith the (PU-RS) of a particular service 24 cannot be removed in connection with such particular service 24. Thus, an example of a portion of a removable license is as follows:

<LICENSE version="2.0.0.0">
  <LICENSORINFO>
    <DATA>
      <KID>{value}</KID>
      <LID>{value}</KID>
      <PU-RS>{value}</PU-RS>

Note here that the portion of the license 16 identified by the 'KID' tag is a content ID identifying the corresponding content 12, that the portion of the license 16 identified by the 'LID' tag is a license ID identifying the license 16 itself, and that the portion of the license 16 identified by the 'PU-RS' tag is the public key of the removing service 24 (PU-RS).

In general, a client 14 wishing to remove one or more licenses 16 associated with a particular service 24 issues a challenge 26 to the service 24 with an identification of the one or more licenses 16, and receives a response 28 from the service 24 with the identification of the one or more licenses 16. Based on the challenge 26, then, the service 24 is notified of the licenses 16 that are to be removed, and based on the response 28, the client 14 is trusted to in fact remove the licenses 16. Thus, it should be appreciated that although the client 14 might have been able to remove the licenses 16 on its own without any challenge 26 or response 28, such challenge 26 is designed to inform the service 24 of the actions the client 14 intends to take, and the response 28 is designed to ensure that the service 24 can control and specify the actions the client 14 in fact takes based on the notification in the challenge 26. With the challenge 26 and response 28, then, the service 24 is ensured that the client 14 does indeed carry through with the removal.

Significantly, in both the challenge 26 and the response 28, the identification of the one or more licenses 16 to be removed can take any particular definable and recognizable form without departing from the spirit and scope of the present invention. For example, it may be the case that each license 16 is identified within the challenge 26 and/or response 28 according to a LID thereof. More generally, though, almost any criteria that may be associated with a license 16 may be employed to identify same within the challenge 26 and/or response 28, including the KID thereof, the issuing service, time and/or date and/or range thereof of issuance, license type, right granted by the license 16, user to which the license 16 was issued, etc.

In one embodiment of the present invention, such identification of licenses 16 is achieved by including with the challenge 26 and/or response 28 a License Identification Block (LIB) that identifies the licenses 16 that are to be removed. Such identification within the LIB may include a specific identification of each license 16 and/or criteria by which a type of license 16 is to be selected. In either case, the identification within the LIB is employed to find matching licenses 16 that are to be removed from the client 14. Typically, the LIB is based on attributes and other information available within each license 16 and/or external to each license 16, and is in a form recognizable to the recipient. Such LIB should be signed by a private key of the issuer to prevent tampering, and may be encrypted to prevent unwanted review by any inquisitive third party.

Figure 4:
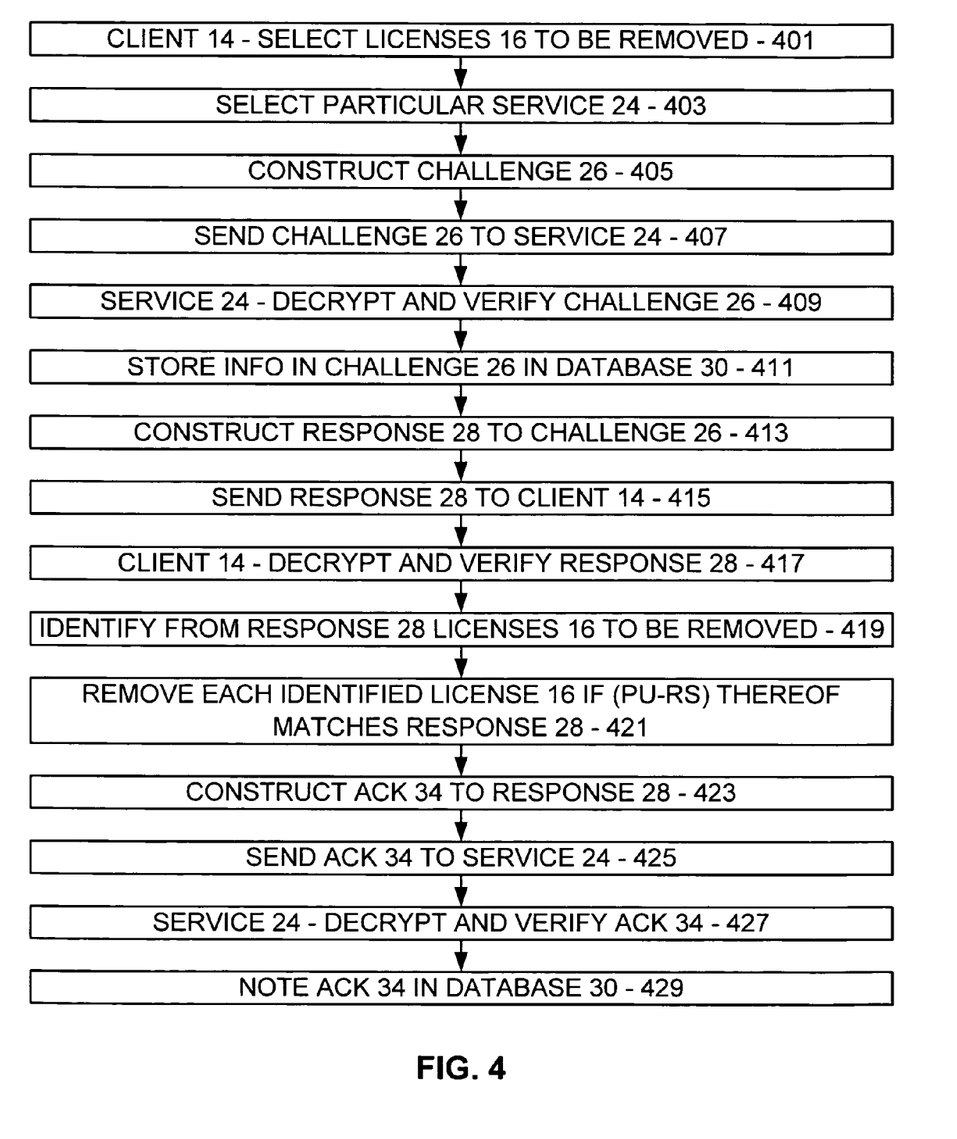
FIG. 4 is a flow diagram showing key steps performed by the client and service of FIG. 3 in notifying the service that the license of the client is to be removed and in removing the license in a trusted manner in accordance with one embodiment of the present invention.

Turning now to FIG. 4, a method is disclosed for a client 14 to remove one or more licenses 16 thereon associated with a particular service 24. As may be appreciated, the process begins by the client 14 selecting the one or more licenses 16 thereon that are to be removed (step 401), and also selecting the particular service 24 (step 403). Such selections may be achieved in any appropriate manner without departing from the spirit and scope of the present invention, and the selection of the licenses 16 in particular may be based on an identification of individual licenses 16 and/or criteria by which a type of license 16 is identified. Note that with regard to selecting a single particular license 16 to be removed as at step 401, selecting the service as at step 403 is performed with regard to the (PU-RS) set forth in the selected license 16.

Note too that while it may be useful to ensure that each selected license 16 has the (PU-RS) of the selected particular service 24, such an occurrence is not viewed as a necessity. Instead, it may be the case that at least some of the selected licenses 16 do not have the (PU-RS) of the selected particular service 24, such as for example in the case where the selection of licenses 16 is based on criteria that are broad enough to encompass licenses 16 having differing (PU-RS)s. Nevertheless, and as seen below, only those selected licenses 16 having the (PU-RS) of the selected service 24 will in fact be removed.

With the selected licenses 16 and the selected service 24, then, the client 14 constructs the challenge 26 (step 405) to include therein:
  a challenge LIB identifying individual licenses 16 to be removed and/or criteria by which a type of license 16 is to be selected for removal;
  an identification of the client 14;
  a public key of the client 14 (PU-C), typically in the form of a digital certificate including same; and
  a transaction ID (TID) identifying the challenge 26;

Again, the challenge LIB within the challenge 26 may be signed by a private key of the client 14 (PR-C) corresponding to (PU-C) to prevent tampering, and may be encrypted to prevent unwanted review by any inquisitive third party. In addition or in the alternative, the entire challenge 26 may be encrypted and/or signed. Note that in at least some instances it may be the case that the challenge LIB is constructed as the challenge 26 and includes all relevant information relating to the challenge 26 therein. However, a challenge LIB with information relating to a challenge 26 therein is not believed to be substantively different than a challenge 26 with a challenge LIB and other information therein.

Thereafter, the client 14 sends the challenge 26 to the service 24 (step 407), and upon receipt, the service 24 performs any decryption that may be required and also verifies the signature of the challenge LIB and/or challenge 26 itself based on the public key of the client 14 (PU-C) as included with the challenge 26 (step 409). As may be appreciated, if any signature fails to verify, the challenge 26 is not to be honored. In such a situation, the service 24 may either fail to respond at all, may respond with a denial response, or the like.

Presuming that each signature of the challenge 26 verifies, the service 24 stores the information in the challenge 26, including the challenge LIB, the identification of the client 14, the TID, and the machine Public Key in a database 30, along with any other appropriate transaction-related information (step 411). As may be appreciated, such stored items in the database 30 may be retrieved by the service 24 or by another service 32 for whatever reasons may be deemed necessary. For example, it may be the case in connection with a 'return' of a license 16 for a refund that the another service 32 is a credit issuer, and that the credit issuer 32 will only issue a credit in connection with a license 16 on the client 14 if the credit issuer 32 can confirm from the database 30 that the license 16 on the client 14 has been removed. Likewise, it may be the case in connection with a 'transfer' of a license 16 that the another service 32 is a license issuer, and that the license issuer 32 will only issue a license 16 for a second client 14 if the license issuer 32 can confirm from the database 30 that a corresponding license 16 on a first client 14 has been removed.

The service 24 in addition to storing the information as at step 411 also constructs the response 28 corresponding to the challenge 26 (step 413). In particular, the constructed response 28 includes:
- a response LIB identifying individual licenses 16 to be removed and/or criteria by which a type of license 16 is to be selected for removal;
- the identification of the client 14, perhaps;
- the public key of the service 24 (PU-RS), typically in the form of a digital certificate including same; and
- the TID from the challenge 26;

Once again, the response LIB within the response 28 may be signed by a private key of the service 24 (PR-RS) corresponding to (PU-RS) to prevent tampering, and may be encrypted to prevent unwanted review by any inquisitive third party. In addition or in the alternative, the entire response 28 may be encrypted and/or signed. Note that in at least some instances it may be the case that the response LIB is constructed as the response 28 and includes all relevant information relating to the response 28 therein. However, a response LIB with information relating to a response 28 therein is not believed to be substantively different than a response 28 with a response LIB and other information therein.

Note, too, that the response LIB in the response 28 may be identical or nearly identical to the challenge LIB in the corresponding challenge 26, or may be altered in a material and/or substantial manner. Such alteration as performed by the service may be any alteration without departing from the spirit and scope of the present invention. For example, it may be that the alteration is based on a filtering of the challenge LIB by the service 24, it may be that the alteration is designed to define the licenses 16 to be removed as set forth within the response LIB in a more definite form, it may be that the service 24 issues each response LIB according to a predefined common format, or the like. In any event, if the response LIB is altered as compared with the challenge LIB, the service 24 may choose to store the response LIB in the database 30 with the challenge LIB and other information from the challenge 26.

Note, further, that by including (PU-RS) within the response 28, the client 14 when removing licenses 16 based thereon can confirm that each license 16 to be removed includes such (PU-RS), as will be set forth in more detail below. Thus, and as was alluded to above, a license 16 can only be removed based on a response 28 if the license 16 and the response 28 both include the same (PU-RS) therein. As might be appreciated, while a nefarious entity might construct a rogue response including such (PU-RS) therein in an effort to remove a license 16 with such (PU-RS) from the client 14, such client 14 in employing such (PU-RS) in the response 28 to verify a digital signature thereof will find the verification fails. In particular, the nefarious entity may be in possession of the public key (PU-RS) but should not be in possession of the corresponding private key (PR-RS) and therefore cannot construct a digital signature based on such (PR-RS) that would verify based on (PU-RS).

Thereafter, the service 24 sends the response 28 to the client 14 (step 415), and upon receipt, the client 14 performs any decryption that may be required and also verifies the signature of the response LIB and/or response 28 itself based on the public key of the service 24 (PU-RS) as included with the response 28 (step 417). As before, if any signature fails to verify, the response 28 is not to be honored. In such a situation, the client 14 may resend the challenge 26, reconstruct the challenge 26 and send same, or the like. In addition, the client 14 confirms that the TID of the response 28 matches the TID of the challenge 26.

Presuming that each signature of the response 28 verifies and the TIDs match, the client 14 then retrieves the response LIB from the response 28 and employs same to identify one or more licenses 16 to be removed (step 419). Such identification may be performed in any appropriate manner without departing from the spirit and scope of the present invention, and as should be appreciated is based on the data within the response LIB that identifies individual licenses 16 to be removed and/or criteria by which a type of license 16 is to be selected for removal. The client 14 then in fact removes each identified license 16, but only if the identified license 16 has the same (PU-RS) as the response 28 (step 421). Thus, and again, a license 16 can only be removed based on a response 28 from a service 24 having a (PU-RS) if the license 16 and the response 28 both include the same (PU-RS) therein.

Once all identified and removable licenses 16 have in fact been removed, the client 14 then constructs an acknowledgment (ACK) 34 to be sent to the service 24 (step 423). In particular, the constructed ACK 34 includes:
- the identification of the client 14, perhaps;
- the public key of the client 14 24 (PU-C), perhaps, typically in the form of a digital certificate including same; and
- the TID from the challenge 26 and the response 28;

Yet again, the ACK may be signed by the private key of the client 14 (PR-C) corresponding to (PU-C) to prevent tampering, and may be encrypted to prevent unwanted review by any inquisitive third party. Note that that the identification of the client 14 and/or the (PU-C) thereof may be included with the ACK 34 or else the service 24 may if need be obtain such information from the database 30 based on the TID in the ACK 34.

Thereafter, the client 14 sends the ACK 34 to the service 24 (step 425), and upon receipt, the service 24 performs any decryption that may be required and also verifies the signature of the ACK 34 based on the public key of the client 14 (PU-C) as included with the ACK 34 (step 427). As before, if any signature fails to verify, the ACK 34 is not to be honored. In such a situation, the service 24 may either fail to respond at all, may respond with a denial response, or the like. In addition, the service 24 confirms that the TID of the ACK 34 matches the TID of the response 28 and challenge 26 by way of the database 30.

Presuming that the signature of the ACK 34 verifies and the TIDs match, the service 24 then notes in the database 30 that the corresponding response 28 was acknowledged (step 429) and the transaction is complete. Based on such acknowledgment, the client 14 as identified within the database 30 according to the TID of the ACK 34 can for example be recognized as having an updated subscription. Note that upon the transaction be completed, it may be prudent for the service 24 to remove sensitive information relating to the client 14 from the database 30, such as for example (PU-C) thereof.

Conclusion

The present invention may be practiced with regard to any appropriate client 14 and service 24, presuming that such client 14 and service 24 have appropriate trusted components 18 thereon. As should now be appreciated, with the present invention as set forth herein, removal of licenses 16 from a client 14 may be performed in a trusted manner.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that effectuates trusted removal of a license 16 from use by a client 14. The architecture and method notifies a service 24 in a trusted manner that the license 16 is to be removed from use by the client 14 and in fact removes the license 16 in a trusted manner from use by the client 14.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A computer-implemented method of removing a digital license from a client computing device, the digital license including an identification of a removal service that can authorize removing such license, the method comprising:
   the client selecting the license to be removed, the license comprising a public key of the service;
   the client selecting the service by identifying the service using the public key of the service comprised in the license, the service comprising computing logic adapted to coordinate removal of licenses from the client;
   the client constructing a challenge including therein a challenge license identification block (LIB) identifying the license to be removed, an identification of the client, and a challenge transaction ID identifying the challenge and being separate and not derived from an identification of the client, a license, or licensed content;
   the client sending the challenge to the service;
   the service receiving the challenge and storing at least a portion of the challenge in a database;
   the service constructing a response corresponding to the challenge and including therein a response LIB identifying the license to be removed, the transaction ID identifying the challenge, and a public key of the service, and sending the response to the client;
   the client receiving the response, confirming that the transaction ID in the response matches the transaction ID in the challenge, and employing the response LIB from the response to identify the license to be removed;
   the client removing the identified license upon confirming that the public key of the service in the identified license matches the identification of the service in the response;
   the client constructing an acknowledgment corresponding to the response and including therein the transaction ID from the response, and sending the acknowledgement to the service, and
   the service receiving the acknowledgment, confirming that the transaction ID in the acknowledgement matches the transaction ID in the response, and noting in the database that the response was acknowledged.

2. The method of claim 1 comprising the client constructing the challenge further including a digital signature based at least in part on the challenge LIB, the method further comprising the service verifying the signature.

3. The method of claim 1 comprising the client constructing the challenge including therein the challenge LIB in an encrypted form, the method further comprising the service decrypting the encrypted challenge LIB.

4. The method of claim 3 further comprising the client confirming that the TID in the response matches the TID in the challenge.

5. The method of claim 3 comprising the service constructing the response further including a digital signature based at least in part on the response LIB, the method further comprising the client verifying the signature.

6. The method of claim 3 comprising the service constructing the response including therein the response LIB in an encrypted form, the method further comprising the client decrypting the encrypted response LIB.

7. The method of claim 3 comprising the service constructing the response including therein the response LIB in one of a form different than the challenge LIB and a form substantially identical to the challenge LIB.

8. The method of claim 1 further comprising another service retrieving the at least a portion of the challenge from the database for use thereby.

9. The method of claim 1 wherein at least the response includes a transaction ID (TID) therein, the method further comprising:
   the client constructing an acknowledgment (ACK) corresponding to the response and including therein the TID from the response, and sending the ACK to the service; and
   the service receiving the ACK and noting in the database that the response was acknowledged.

10. The method of claim 9 further comprising the service confirming that the TID in the ACK matches the TID in the response.

11. A computer-implemented method of removing a digital license from a client computing device, the digital license including an identification of a service that can authorize removing such license, the method comprising the client:
   the client computing device selecting the license to be removed, the license comprising a public key of the service;
   the client computing device selecting the service by identifying the service using the public key of the service comprised in the license;
   the client computing device constructing a challenge including therein a challenge license identification block (LIB) identifying the license to be removed, an identification of the client, and a transaction ID identifying the challenge and being separate and not derived from an identification of the client, a license, or licensed content;
   the client computing device sending the challenge to the service,
   the service receiving the challenge and storing at least a portion of the challenge in a database, constructing a response corresponding to the challenge and including therein a response LIB identifying the license to be removed, the transaction ID identifying the challenge, and a public key of the service, and sending the response to the client;

the client computing device receiving the response, confirming that the transaction ID in the response matches the transaction ID in the challenge, and employing the response LIB from the response to identify the license to be removed;

the client computing device removing the identified license upon confirming that the public key of the service in the identified license matches the identification of the service in the response; and the client computing device constructing an acknowledgment corresponding to the response and including therein the transaction ID from the response, and sending the acknowledgement to the service, and the service receiving the acknowledgment, confirming that the transaction ID in the acknowledgement matches the transaction ID in the response, and noting in the database that the response was acknowledged.

12. The method of claim 11 comprising the client constructing the challenge further including a digital signature based at least in part on the challenge LIB, the method further comprising the service verifying the signature.

13. The method of claim 11 comprising the client constructing the challenge including therein the challenge LIB in an encrypted form, the method further comprising the service decrypting the encrypted challenge LIB.

14. The method of claim 13 further comprising the client confirming that the TID in the response matches the TID in the challenge.

15. The method of claim 13 wherein the service constructs the response to further include a digital signature based at least in part on the response LIB, the method further comprising the client verifying the signature.

16. The method of claim 13 wherein the service constructs the response to include therein the response LIB in an encrypted form, the method further comprising the client decrypting the encrypted response LIB.

17. The method of claim 11 wherein at least the response includes a transaction ID (TID) therein, the method further comprising the client constructing an acknowledgment (ACK) corresponding to the response and including therein the TID from the response, and sending the ACK to the service, wherein the service receives the ACK and notes in the database that the response was acknowledged.

18. A computer-implemented method of removing a digital license from a client computing device, the digital license including an identification of a service that can authorize removing such license, the method comprising:

a client computing device selecting the service by identifying the service using the public key of the service comprised in the license;

the client computing device constructing a challenge including therein a challenge license identification block (LIB) identifying the license to be removed, an identification of the client, and a transaction ID identifying the challenge and being separate and not derived from an identification of the client, a license, or licensed content;

the client computing device sending the challenge to the service, the method comprising the service:

a service receiving the challenge and storing at least a portion of the challenge in a database;

the service constructing a response corresponding to the challenge and including therein a response LIB identifying the license to be removed, the transaction ID identifying the challenge, a transaction ID identifying the response, and a public key of the service, and sending the response to the client, the client computing device receiving the response, confirming that the transaction ID in the response matches the transaction ID in the challenge, and employing the response LIB from the response to identify the license to be removed, the client computing device removing the identified license upon confirming that the public key of the service in the identified license matches the identification of the service in the response, the client computing device constructing an acknowledgment corresponding to the response and includes therein the transaction ID from the response, and sends the acknowledgement to the service, and the service receiving the acknowledgment, confirming that the transaction ID in the acknowledgement matches the transaction ID in the response, and noting in the database that the response was acknowledged.

19. The method of claim 18 comprising the service constructing the response further including a digital signature based at least in part on the response LIB, wherein the client verifies the signature.

20. The method of claim 18 comprising the service constructing the response including therein the response LIB in an encrypted form, wherein the client decrypts the encrypted response LIB.

21. The method of claim 18 comprising the service constructing the response including therein the response LIB in one of a form different that the challenge LIB and a form substantially identical to the challenge LIB.

22. The method of claim 18 further comprising another service retrieving the at least a portion of the challenge from the database for use thereby.

* * * * *